United States Patent [19]

Reiter et al.

[11] Patent Number: 4,590,025

[45] Date of Patent: May 20, 1986

[54] IMPREGNATION OF THREAD-COVERED WIRES AND BRAIDED CONDUCTORS BY EXTRUSION OF THERMOPLASTICS

[75] Inventors: Udo Reiter, Mutterstadt; Helmut Lehmann, Reinbek, both of Fed. Rep. of Germany

[73] Assignee: Dr. Beck & Co. Aktiengesellschaft, Hamburg, Fed. Rep. of Germany

[21] Appl. No.: 722,770

[22] Filed: Apr. 16, 1985

Related U.S. Application Data

[63] Continuation-in-part of Ser. No. 504,038, Jun. 30, 1983, abandoned.

[30] Foreign Application Priority Data

Nov. 19, 1981 [DE] Fed. Rep. of Germany ....... 3145918

[51] Int. Cl.⁴ ............................................ B29F 3/10

[52] U.S. Cl. .................................... 264/103; 264/174; 427/117; 427/118; 427/120; 174/121 R; 174/122 G; 174/122 C; 174/124 GC; 174/128 R; 174/131 B

[58] Field of Search ........................ 427/117, 118, 120; 264/174, 103; 174/121 R, 122 G, 122 C, 124 GC, 128 R, 131 B

[56] References Cited

U.S. PATENT DOCUMENTS

| | | | |
|---|---|---|---|
| 2,163,119 | 6/1939 | Freeland | 174/122 G |
| 2,349,951 | 5/1953 | Fuller et al. | 427/118 |
| 2,349,952 | 5/1953 | Fuller et al. | 427/118 |
| 2,636,923 | 4/1953 | Perzel | 264/174 |
| 2,669,754 | 2/1954 | Chadbourne | 264/174 |
| 2,718,544 | 9/1955 | Shepp | 174/122 G |
| 3,172,931 | 3/1965 | Peterson | 264/174 |
| 3,579,379 | 5/1971 | Van Berkel et al. | 427/120 |
| 3,606,632 | 9/1971 | Bunish | 174/122 G |
| 3,856,888 | 12/1974 | Schmerling | 524/10 |
| 3,957,905 | 5/1976 | Sumoto et al. | 524/140 |
| 4,033,800 | 7/1977 | Ollis | 264/174 |
| 4,131,758 | 12/1978 | Felkel | 174/128 R |
| 4,145,474 | 3/1979 | Kertscher | 428/379 |
| 4,165,957 | 8/1979 | Kertscher | 425/113 |
| 4,172,859 | 10/1979 | Epstein | 525/109 |
| 4,186,241 | 1/1980 | Janssen | 428/458 |
| 4,215,032 | 7/1980 | Kobayashi et al. | 524/377 |
| 4,309,597 | 1/1982 | Crowley | 264/174 |

FOREIGN PATENT DOCUMENTS 0017062 10/1980 European Pat. Off. .

*Primary Examiner*—Richard Bueker
*Attorney, Agent, or Firm*—Wells & Wells

[57] ABSTRACT

The purpose of the invention is to manufacture varnish-bonded thread-covered circular-section and profile-section wires and braided conductors in a manner which is particularly cheap and which involves particularly little risk of contaminating the environment.

Suitable thread-covered wires and braided conductors are obtained by impregnation, in one operation, with partially crystalline or amorphous thermoplastic polycondensates.

6 Claims, No Drawings

IMPREGNATION OF THREAD-COVERED WIRES AND BRAIDED CONDUCTORS BY EXTRUSION OF THERMOPLASTICS

This is a continuation-in-part of application Ser. No. 504,038, filed June 30, 1983, now abandoned.

BACKGROUND OF THE INVENTION

The invention relates to covered wires, which are varnish-bonded, and to a novel process for the impregnation of covered circular-section or profile-section wires, as well as of braided conductors.

The wires and braided conductors employed in this process are preferably composed of copper or aluminum.

The technique whereby copper conductors or aluminum conductors are covered with an insulating layer of fabric fibers has long been known, this covering operation being performed, in some instances, after the conductor has received an insulating coating of varnish, and being followed, in some instances, by an impregnating operation in which a varnish is used.

In this prior art technique, the most diverse insulating materials come to be employed, eg. cellulose paper, cotton yarn, silk yarn, acetate yarn, polyamide yarn, etc., which are effected by elevated temperatures to a greater or lesser degree, and which usually receive a thermally stable impregnation in order to improve their thermal properties. It is more favorable to employ glass-fiber yarn for the covering, since this material, on its own, already meets the most rigorous temperature requirements and, furthermore, possesses valuable electrical properties. However, the wetting ability of glass fiber and its capacity to absorb impregnating agents are poor. For these reasons, it is necessary to carry out the impregnating operation concurrently with the covering operation, in order, by this means, to achieve firm anchoring of the glass fiber to the wire, and to prevent the glass-fiber covering from lifting away from the wire during the process of introducing the conductors into the slots, and during the bending and twisting which are associated with this insertion process.

The impregnating varnish also has the function of embedding the thin, fragile glass fibers, so that they bake together to form a solid mass, and thus impart a smooth surface to the covered wire.

The dielectric properties are improved by the filling of the interspaces during impregnation. In order to improve these properties further, a conventional varnished wire can be employed instead of a bare wire.

In the past, very diverse types of varnish have been used as impregnating agents, these varnishes belonging to Insulation Classes B and F, while some varnishes also belong to Class H. However, due to the fact that glass fiber is resistant to elevated temperatures, the complete system can usually be assigned to Class H.

The varnish-bound thread-covered wires are customarily produced on conventional varnished-wire machines, which have been supplemented by one to two covering apparatuses, or, alternatively, on units which are similar to the commercially available horizontal and vertical machines for producing varnished wire. The excess varnish is wiped off, preferably by means of a rubber sponge.

Using machines of the types mentioned above, the following operations are possible in a process for the manufacture of varnish-bonded glass-fiber-covered wires:

(1) Application, in the varnish bath, of a varnish to the bare conductor
(2) Partial curing of the film of varnish
(3) 2nd application of varnish
(4) Covering, with thread, into the film of wet varnish
(5) 3rd application of varnish
(6) Second covering operation, frequently performed in the opposite direction
(7) 4th application of varnish
(8) Curing of the insulating structure obtained after (1)-(7)
(9) 5th application of varnish
(10) Curing
(11) Repeat operations (9) and (10) several times, to meet the requirements, such as the desired layer thickness, etc.

The multiplicity of operations indicate that such a process is extremely inconvenient.

With the growing requirement for electrical conductors possessing good mechanical and dielectric properties allied with high stability at elevated temperatures, for use in fields involving high mechanical stresses and severe thermal conditions, eg. in welding transformers or railroad traction-motors or for braided connections to electrical components subject to high temperatures, the demand for thread-covered wires also increases especially for glass-fiber-covered wires, since the glass fiber, on its own, immediately gives rise to a high degree of resistance to elevated temperatures.

The above-mentioned process steps are now not only very extravagant in terms of labor and time. The process also possesses further disadvantages, which originate, in particular, as a result of the processing of varnishes with high solvent contents.

The disadvantages are:

(a) Contamination of the environment with solvent-laden waste air, or, alternatively, the use of expensive catalytic combustion processes for destroying the solvents.

(b) Inadequate adhesion of the covering to the conductor material, since the thick film of varnish, as described in the process, is not cured to the optimum extent.

(c) The development of bubbles during the curing of the film of varnish, which contains solvents, the presence of bubbles resulting in poor electrical properties, eg. poor dielectric resistance, poor dielectric strength, and inadequate resilience of the insulating structure.

SUMMARY OF THE INVENTION

It is an object of the present invention to develop an improved or simplified process for the impregnation of thread-covered wires and braided connectors, which overcomes the abovementioned disadvantages.

The technique whereby copper conductors or aluminum conductors are covered by thermoplastics has likewise been known for a long time, these materials being applied by extrusion. In this technique, use is made of the process known as tube extrusion, ie. a tube of the thermoplastic material is injection-molded around the conductor, in a first operation, this tube thereafter being shrunk down, onto the conductor, in a second operation, by drawing. This drawing-down effect is obtained by pulling off the conductor at a speed which is greater than the speed at which the tube is expelled from the injection-molding die. In this operation, the layer thickness is controlled solely by the speed.

Employing the process which is described in previous German Published Application DAS No. 2,638,763 corresponding to U.S. Pat. No. 4,145,474, it becomes possible, for the first time, to manufacture winding wires by the extrusion, in one operation, of thermoplastic polycondensates, without subsequent treatment, such as drawing, and in a layer thickness conforming to the DIN German Industrial Standard No. 46,435. In this process, the layer thickness is determined by the die system.

Partially crystalline thermoplastic polycondensates having crystallite melting points above 170° C. are used, in the solvent-free condition, as the coating material.

Patent protection is sought, in further previous Applications, for specific partially crystalline thermoplastic polycondensates for the extrusion-coating of winding wires, and, in addition, for amorphous thermoplastic polycondensates, for the same purpose (cf. German Laid-Open Applications DOS No. 2,753,917 corresponding to U.S. Pat. No. 4,186,241, DOS No. 2,911,269, DOS No. 2,935,458 and DOS No. 2,936,795).

DESCRIPTION OF THE PREFERRED EMBODIMENTS

We have found, in a surprising manner, that the abovementioned object is achieved, according to the invention, in that varnish-bonded thread-covered circular-section or profile-section wires, or braided conductors, can be manufactured by a process wherein the thread-covered wires or braided conductors are impregnated, in a single operation, with partially crystalline or amorphous thermoplastic polycondensates.

The embodiments of impregnating the thread-covered wires or braided conductors with thermoplastic polycondensates include:

(1) using partially crystalline thermoplastic polycondensates having crystallite melting points above 170° C. as the thermoplastic polycondensates;

(2) using amorphous polyether sulfones as the thermoplastic polycondensates;

(3) using fire-retardant thermoplastic polycondensates as the thermoplastic polycondensates;

(4) employing thread-covering bare wires as the thread-covered wires;

(5) employing thread-covered wires and braided conductors which have been obtained by coating winding wires by varnishing processes or by extrusion processes;

(6) using wires and braided conductors which have been covered with glass fiber as the thread-covered wires and braided conductors; and (7) impregnated thread-covered wires and braided conductors which have been obtained by means of the extrusion process of the present invention.

According to the above, the invention enables the extrusion-coating process, known from the previous Applications which have been cited, to be employed for the first time for the impregnation of thread-covered wires, and of braided conductors, with partially crystalline or amorphous thermoplastic polycondensates, which offers the following advantages:

(a) The sequence of repeated varnishing and curing processes are unnecessary, since the bare conductors or varnished wires, or braided conductors, which have been thread-covered either once or several times, are impregnated in a single operation and are thereby consolidated.

(b) The process is, however, not only very cheap, but the use of solvent-free thermoplastics also renders it environmentally safe.

(c) Instead of a wire which has been coated, in accordance with the customary production method, with a known polyester varnish, or with a polyester-imide varnish, a winding wire which has been produced by the extrusion process with thermoplastic polycondensates, in accordance with the previous Applications, can also be employed for the extrusion-impregnation process.

(d) In contrast to the varnish-impregnation process, it is possible to employ coating material which has been adjusted to be fire-retardant. Certainly, no impregnating varnishes with fire-retardant properties have been disclosed up to the present time.

(e) The thread-covered wires and braided conductors, impregnated according to the invention, are distinguished by improved embedding of the individual fibers from which the covering is built up, by better adhesion of the insulating structure to the conductor, as well as by improved resilience, these improvements most probably resulting from the pressure-impregnation occurring in the die.

The thermoplastic polycondensates mentioned in the previous Applications can be employed as the thermoplastic material for the extrusion-impregnation process according to the invention, eg. the following partially crystalline polycondensates, namely linear aromatic polyesters, such as polyethylene terephthalate, which may also contain titanium dioxide as a filler, linear aliphatic or aromatic polyamides, polyphenylene sulfide, these partially crystalline polycondensates having crystallite melting points above 170° C., as well as polyether ketones and araliphatic polyamides with crystallite melting points of not less than 280° C., and the amorphous polyether sulfones.

It is possible to employ, as thermoplastic polycondensates which have been adjusted to be fire-retardant, thermoplastic polycondensates which have been rendered fire-retardant in accordance with the known flameproofing process using halogen compounds, which may also be in combination with phosphorus compounds, eg. polyethylene terephthalate with brominated oligostyrene or with polybrominated diphenyl ether or with hexabromophenyl and triphenylphosphine oxide. It should be noted that the polyether sulfones require no additives, since they are intrinsically fire-retardant (according to Underwriters' Lab. Test 94-V0).

The wire material for the impregnation process according to the invention includes both bare wires and varnished wires, and extrusion-coated winding wires in the form of circular-section and profile-section wires and braided conductors, which have been covered with the insulating materials of the various types which are known for covering purposes, eg. cotton yarn, silk yarn, acetate yarn or polyamide yarn, but preferably those insulating materials in which glass fiber, which forms a good foundation for thermally stable insulating systems, has been used as covering material.

The thread-covered wires and braided conductors, impregnated according to the invention, can be employed in all technological fields where rigorous mechanical and thermal requirements are applied, namely in the customary fields of application for varnish-bonded thread-covered wires and braided conductors.

The processing conditions for single-covered wires, or wires with multiple coverings, and filled or unfilled thermoplastic polycondensates are indicated in the examples which follow, and in which the extrusion apparatus described in Swiss Patent Application CH No. 8446/76, corresponding to U.S. Pat. No. 4,165,957, is used.

SPECIFIC EXAMPLES

The specific embodiments of the present invention include:

I. A process for impregnating a covered wire comprising: (a) extrusion coating bare wires with a thermoplastic resins; (b) covering the coated wire of (a) with a continuous fiber to form said covered wire; (c) preheating the covered wire of (b); (d) introducing into an extruder having a wire coating zone solvent-free thermoplastic polycondensates; (e) heating the thermoplastic polycondensates to a molten form; (f) extruding the covered wires through the coating zone and impregnating the covered wire in a single operation; (g) passing the impregnated wire through a doctor die; (h) cooling the doctor died wire; and (i) winding the cooled wire onto a reel.

II. The process of I, wherein the thermoplastic resin of step (a) and the thermoplastic polycondensates of step (d) are polyethylene terephthalate and the continuous fiber of step (b) is glass fiber.

III. The process of II, wherein two layers of glass fiber are applied in step (b).

IV. The process of III, wherein the thermoplastic resin and the thermoplastic polycondensates contain titanium dioxide filler.

V. The process of I, wherein the thermoplastic resin of step (a) and the thermoplastic polycondensates of step (d) are selected from the group consisting of partially crystalline thermoplastic polycondensates having melting points above 170° C., polyether ketones having crystallite melting points of not less than 280° C., araliphatic polyamides having crystalline melting points of not less than 280° C., and amorphous polyether sulfones.

In Examples 1 to 4, a winding wire with either a single-layer covering or a two-layer covering was employed, these wires having been manufactured by being coated, in the extrusion process, with polyethylene terephthalate containing 8% of titanium dioxide as a filler, after which the coated wires were covered with either one layer of two layers of glass fiber. The wire

EXAMPLE 2

-continued

| | |
|---|---|
| Copper wire employed: | |
| Bare wire: | 0.60 mm diameter |
| Winding wire | 0.65 mm diameter (1 layer) |
| Covered with glass fiber (twice) | 0.75 mm diameter |
| Impregnation and coating material: Polyethylene terephthalate, unfilled. | |
| Processing conditions: | |
| Extrusion temperature: | 230/250/275/290/300/300° C. |
| Pull-off speed | 75 m/min |
| Die diameter: | 0.81 mm |
| Increase in diameter: | 60 um |

EXAMPLE 3

| | |
|---|---|
| Copper wire employed: | |
| Bare wire: | 0.60 mm diameter |
| Winding wire: | 0.67 mm diameter (2 layers) |
| Covered with glass fiber (once) | 0.71 mm diameter |
| Impregnation and coating material: Polyethylene terephthalate containing 8% titanium dioxide filler | |
| Processing conditions: | |
| Extrusion temperature: | 210/240/250/265/270/290/310° C. |
| Pull-off speed: | 75 m/min |
| Die diameter: | 0.765 mm |
| Increase in diameter: | 50 um |

EXAMPLE 4

| | |
|---|---|
| Copper wire employed: | |
| Bare wire | 0.60 mm diameter |
| winding wire | 0.67 mm diameter (2 layers) |
| Covered with glass fiber (once) | 0.71 mm diameter |
| Impregnation and coating material: Polyethylene terephthalate, unfilled | |
| Processing conditions: | |
| Extrusion temperature: | 230/250/275/290/290/300/300° C. |
| Pull-off speed: | 75 m/min |
| Die diameter: | 0.765 mm |
| Increase in diameter: | 55 um |

Properties of the impregnated wires

| | Example 1 | Example 2 | Example 3 | Example 4 |
|---|---|---|---|---|
| Hardness+ | 2B | B | HB | HB |
| Residual hardness+ after immersion in a mixture of benzene, xylene and butanol (60/30/10% by vol.) | 2B | B | HB | HB |
| Breakdown voltage at room temp., acc. to DIN 46,453, Part 3, 13 | 3.1 kV | 3.5 kV | 3.7 kV | 3.8 kV |
| Dielectric resistance, at room temp. (conforming to DIN 46,453, Part 1, 19.2) | 500 MΩ km | 400 MΩ km | 1,000 MΩ km | >1,000 MΩ km |
| Adhesion, in terms of deformability during winding (conforming to DIN 46,453, Part 3, 8.1, using a winding mandrel having a diameter equal to 5 times that of the wire) | No failure | No failure | No failure | No failure |

+Hardness determination: the value measured was that at which it just became impossible to push the extruded coating over the glass-fiber covering.

We claim:

1. A process for impregnating a covered wire comprising:

(a) extrusion coating bare wires with a thermoplastic resin;

(b) covering the coated wire of (a) with a continuous glass fiber to form said covered wire;

(c) preheating said covered wire of (b);

(d) introducing solvent-free thermoplastic polycondensates into an apparatus comprising a screw extruder and an extrusion head connected at the downstream end of said screw extruder, said extrusion head comprising at least one extrusion unit formed of a die holder with a gauging die and a guiding die coaxially held therein, said gauging die having a cylindrical bore portion at its downstream end; a frustoconical bore joining said cylindrical bore portion at the upstream side thereof; and a frustoconical entry portion of an aperture angle greater than said frustoconical bore, joining said frustoconical bore at the upstream end thereof, said guiding die having a central passageway matching said covered wire in diameter and a downstream face of frustoconical shape facing said entry portion, said downstream face and said entry portion determining therebetween an annular distribution chamber of frustoconical shape arranged in such a manner that said thermoplastic polycondensates gradually accelerate therein and said die holder containing holes therethrough for feeding the annular base of said distribution chamber with said thermoplastic polycondensates from said extruder;

(e) heating said thermoplastic polycondensates to a molten form in said apparatus;

(f) extruding said covered wires through said apparatus and impregnating said covered wire in a single operation;

(g) passing said impregnated wire through said gauging die;

(h) cooling said gauging died wire; and (i) winding said cooled wire onto a reel.

2. The method of claim 1, wherein said frustoconical bore of apparatus (d) has an aperture angle between 2° and 20°.

3. The process of claim 1, wherein said thermoplastic resin of step (a) and said thermoplastic polycondensates of step (d) are polyethylene terephthalate and said fiber of step (b) is glass fiber.

4. The process of claim 3, wherein two layers of glass fiber are applied in step (b).

5. The process of claim 4, wherein said thermoplastic resin and said thermoplastic polycondensates contain titanium dioxide filler.

6. The process of claim 1, wherein said thermoplastic resin of step (a) and said thermoplastic polycondensates of step (d) are selected from the group consisting of partially crystalline thermoplastic polycondensates having melting points above 170° C., polyether ketones having crystallite melting points of not less than 280° C., araliphatic polyamides having crystallite melting points of not less than 280° C., and amorphous polyether sulfones.

* * * * *